United States Patent [19]

Hays

[11] Patent Number: 5,746,821

[45] Date of Patent: May 5, 1998

[54] PIGMENT COMPOSITIONS

[75] Inventor: Byron G. Hays, Chagrin Falls, Ohio

[73] Assignee: Engelhard Corporation, Iselin, N.J.

[21] Appl. No.: 387,994

[22] Filed: Feb. 13, 1995

[51] Int. Cl.[6] .................... C09B 63/00; C09B 29/36
[52] U.S. Cl. ................ 106/496; 534/579; 534/781;
534/783; 534/784; 534/785; 534/786
[58] Field of Search .................. 106/496; 534/579,
534/781, 783, 784, 785, 786

[56] References Cited

U.S. PATENT DOCUMENTS

| | | | |
|---|---|---|---|
| 3,341,513 | 9/1967 | Wegmuller et al. | 534/781 |
| 3,423,393 | 1/1969 | Klein | 534/781 |
| 3,905,952 | 9/1975 | Speck | 534/784 |
| 4,045,425 | 8/1977 | Hunter | 534/781 |
| 4,594,411 | 6/1986 | Henning | 534/784 |
| 4,980,458 | 12/1990 | Hari et al. | 534/575 |
| 5,047,517 | 9/1991 | Deucker | 534/784 |
| 5,457,188 | 10/1995 | Zimmermann | 106/496 |
| 5,482,546 | 1/1996 | Eida | 534/781 |

FOREIGN PATENT DOCUMENTS

| | | |
|---|---|---|
| A 2 034 686 | 12/1970 | France . |
| A 2 201 329 | 4/1974 | France . |
| A 2 299 387 | 8/1976 | France . |
| A 26 21 529 | 11/1976 | Germany . |
| 2616981 | 10/1977 | Germany . |
| 4111348A | 10/1992 | Germany . |
| 50-67841 | 6/1975 | Japan . |
| A 105 653 | 7/1924 | Switzerland . |
| 691 475 | 5/1953 | United Kingdom . |
| 2 114 991 | 9/1983 | United Kingdom . |
| 2 185 491 | 7/1987 | United Kingdom . |

OTHER PUBLICATIONS

Chemical Abstracts, S. Hyodo: "Azo Lake Pigments", vol. 83, No. 22, 1 Dec. 1975, p. 116.
Chemical Abstracts, T. Tachibana et al: "Coloring with Azo Lake Pigments", vol. 89, No. 14, 2 Oct. 1978, p. 82.
Chemical Abstracts, A. Wawrzyniak et al.: "Simultaneous Creaseproofing and Permanent Dyeing of Products with Cellulose Fibers", vol. 92, No. 8, 25 Feb. 1980, p. 75.

Primary Examiner—Helene Klemanski
Attorney, Agent, or Firm—R. F. Keller

[57] ABSTRACT

Disclosed are compositions comprising one or more compounds characterized by the formula:

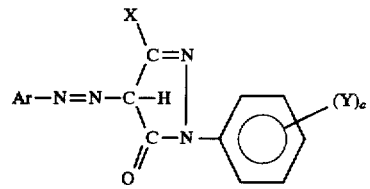

wherein Ar is an aromatic moiety having at least one substituent which is an acid group or salt thereof; X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; and a is 1, 2 or 3. Also disclosed is a process for preparing azo dyes which comprises coupling (i) at least one diazonium component of one or more aromatic amines containing at least one sulfonic acid group or carboxylic acid group, or salts thereof; with (ii) at least one coupling component represented by the formula:

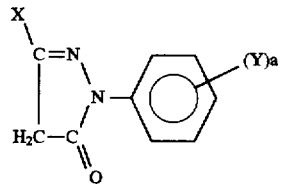

wherein X, Y and a are as defined above. The dye compositions prepared by this process and the azo pigments derived from such dyes are also disclosed.

Paint, ink and plastic compositions containing the foregoing pigments compositions are disclosed.

17 Claims, No Drawings

PIGMENT COMPOSITIONS

BACKGROUND OF THE INVENTION

1. Field of the Invention

This invention relates to novel azo yellow pigments, azo dyes, processes for their preparation and to paint, plastic and ink compositions containing such pigments.

2. Description of Related Art

Azo yellow pigments known in the art are useful as coloring agents for paints and printing inks. Use in plastics is more limited due to the fact that these pigments tend to bloom and discolor at high temperatures. German Offenlegungsschrift specification No. 2616981 describes the calcium salt of diazotized 2-amino-4,5-dichlorobenzene-1-sulfonic acid coupled into 1-(3'-sulfophenyl)-3-methyl-5 pyrazolone (3-sulfo-PMP) (C.I. Pigment Yellow 183). U.S. Pat. No. 4,980,458 describes the mixed sodium, ammonium or half-calcium salts of diazotized 2-amino-4,5-dichlorobenzene-1-sulfonic acid coupled into 3-sulfo-PMP. U.S. Pat. No. 4,594,411 describes the calcium salts of diazotized 2-amino-5-acetylaminobenzene-1-sulfonic acid, 2-amino-5-methoxybenzene-1-sulfonic acid, 2-amino-5-methylbenzene-1-sulfonic acid or 2-amino-5-chlorobenzene-1-sulfonic acid coupled into 3-sulfo-PMP. U.S. Pat. No. 5,047,517 describes the calcium salt of diazotized 2-amino-4-chloro-5-methylbenzene-1-sulfonic acid coupled into 3-sulfo-PMP (C.I. Pigment Yellow 191). German Offenlegungsschrift specification No. 4111348 describes the strontium salt of diazotized 2-amino-4-chloro-5-methylbenzene-1-sulfonic acid coupled into 3-sulfo-PMP. Also, the pigment from diazotized 3,3'-dichlorobenzidine coupled into 1-(4'-methylphenyl)-3-methyl-5-pyrazolone (PTMP) is known as C.I. Pigment Orange 34.

There is a need for azo yellow pigments that show improved performance in one or more of the following properties: color strength, resistance to polar solvents, lightfastness and heat stability.

SUMMARY OF THE INVENTION

This invention relates to azo pigments suitable for use as coloring agents, dye compositions useful in the preparation of such pigments and processes for their preparation.

In one embodiment, this invention relates to a composition comprising one or more compounds characterized by the formula:

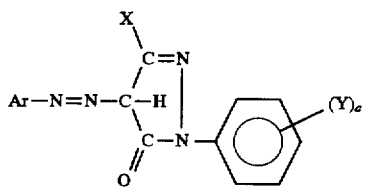

wherein Ar is an aromatic moiety having at least one substituent which is an acid group or salt thereof; X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; and a is 1, 2 or 3.

In another embodiment, this invention relates to a process for preparing an azo dye which comprises coupling (i) at least one diazonium component of one or more aromatic amines containing at least one sulfonic acid group or carboxylic acid group, or salts of such groups; with (ii) at least one coupling component represented by the formula:

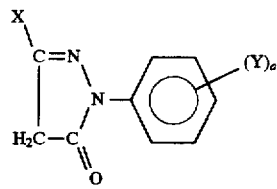

wherein X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; and a equals 1, 2 or 3.

In still another embodiment, this invention relates to azo dye compositions prepared by the foregoing process and azo pigments prepared by metallization of these dyes.

In one other embodiment, this invention relates to paint, plastic and ink compositions containing the azo pigment compositions of this invention.

DESCRIPTION OF THE PREFERRED EMBODIMENTS

As previously stated, this invention provides azo pigments, azo dyes and processes for their preparation. The azo dyes of the present invention are prepared by initially diazotizing one or more aromatic amines containing at least one acid group or alkali metal or ammonium salts thereof to form a diazonium component and thereafter coupling the diazonium component with a coupling component comprised of a pyrazolone coupler to form the desired dye.

A variety of suitable aromatic amines can be utilized for the purposes of the present invention. Almost any primary aromatic amine can be used where the aromatic moiety of such amine contains at least one substituent acid group or alkali metal or ammonium salts thereof (Ar). The aromatic amines may be monoamines or polyamines containing up to four or more amine groups per molecule. Thus, the diazonium components derived from such amine may contain one diazonium group (mono-diazonium), two diazonium groups (bis-diazonium), three diazonium groups (tris-diazonium), etc. The aromatic amines may be monocyclic amines such as aniline and its derivatives, or bicyclic amines such as naphthyl amine. The aromatic amines may also be biphenylamines or polyamines such as aminobiphenyl, benzidine, and 3,3', 4,4'-biphenyltetramine.

In one embodiment, the aromatic amine is a primary aromatic amine characterized by the formula

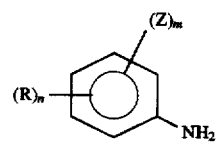
(I)

wherein each R is independently a halogen, hydrocarbyl, hydrocarbyloxy, carboxylic acid ester, sulfonic acid ester, carboxylic acid amide, imidazolone, sulfonic acid amide or nitro group; n is 0, 1 or 2; each Z is independently a —COOH or —SO₃H group, or salts of such groups; m is 1 or 2; wherein it is understood that the imidazalone group is represented by the formula

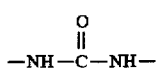

which, when taken together with the aromatic ring, the nitrogen atoms are bonded to adjacent carbons to form a five member ring. The term "hydrocarbyl" as used in this specification and claims is intended to include hydrocarbons which may contain substituent groups such as ether, ester, nitro or halogen which do not materially affect the hydrocarbon character of the group.

The aromatic amines characterized by Formula I may contain 0, 1 or 2 R groups which are each independently a halogen, hydrocarbyl, hydrocarbyloxy, carboxylic acid ester, sulfonic acid ester, carboxylic acid amide, imidazolone, sulfonic acid amide or nitro group. The halogen group can be any of the halogens, although chlorine and bromine are generally used, with chlorine being the most preferred example of a halogen substituent. The hydrocarbyl groups may independently be alkyl, cycloalkyl, aryl, aralkyl or alkaryl groups. For example, if R is an unsubstituted aryl group, the aromatic amine is a biphenyl amine. When R is an alkyl group, the alkyl group generally will contain from one to four carbon atoms. As used herein, "lower alkyl" shall mean those alkyl groups containing from 1 up to 4 carbon atoms. When R is a hydrocarbyloxy group, the hydrocarbyl moiety may be any of the hydrocarbyl groups discussed above although the hydrocarbyloxy group generally is an alkoxy group containing from 1 to about 4 or more carbon atoms. Preferred R groups are methyl, ethyl and chloro groups.

The aromatic amines characterized by Formula I also contain one or two acid groups of —COOH and —SO$_3$H, or salts thereof. In one preferred embodiment, the aromatic amine of Formula I contains an —SO$_3$H group.

Examples of aromatic amines characterized by Formula I wherein Z is a sulfonic acid group and m is 1 include 2-aminobenzene-1-sulfonic acid, 4-aminobenzene-1-sulfonic acid, 2-amino-5-methylbenzene-1-sulfonic acid, 2-amino-5-methoxybenzene-1-sulfonic acid, 3-amino-6-methylbenzene-1- sulfonic acid, 2-amino-4-chloro-5-methylbenzene-1-sulfonic acid, 2-amino-5-chloro-4-ethylbenzene-1-sulfonic acid, 2-amino-5-chloro-4-methylbenzene-1-sulfonic acid, etc.

Examples of aromatic amines characterized by Formula I wherein Z is a carboxylic acid group, and m is 1 include 2-aminobenzoic acid, 3-aminobenzoic acid, 4-aminobenzoic acid, 2-amino-5-methylbenzoic acid, 2-amino-6-methylbenzoic acid, 3-amino-2-methylbenzoic acid, 2-amino-3-methoxybenzoic acid, 4-amino-3-methoxybenzoic acid, 4-amino-5-chloro-2-methoxybenzoic acid, 2-amino-4-chlorobenzoic acid, 3-amino-4-chlorobenzoic acid, etc. The benzene sulfonic acid and benzoic acid compounds can be used per se or as their salts. Examples of preferred salts include the alkali metal salts such as the sodium and potassium salts.

The aromatic amines from which the diazonium components are prepared may be fused cyclic aromatic amine compounds such as compounds derived from various naphthalenes including 2-aminonaphthalene-1-sulfonic acid, 4-aminonaphthalene-1-sulfonic acid, etc. Examples of aromatic amines which are biphenyl amines and polyamines include 4-aminobiphenyl-3'-sulfonic acid, and 4,4'-diaminobiphenyl-2,2'-disulfonic acid.

Mixtures of two or more of any aromatic amines are within the scope of this invention.

The diazotization of the aromatic amines may be carried out in the manners known to those skilled in the art through the use of alkali metal nitrites or lower alkyl nitrites together with an adequately strong acid such as a mineral acid. Examples of useful mineral acid include hydrochloric acid and sulfuric acid. Nitrosyl sulfuric acid also can be utilized. The diazotization reaction can be conducted at a temperature in the range of from about −20° to +30° C., preferably from 0° to 20° C. Although not required, it may be advantageous in some of the diazotization reactions (and in the subsequent coupling reactions) to include a surface-active agent such as a non-ionic, anionic or cationic surface active agent and, optionally, appropriate organic solvents such as, for example, glacial acetic acid, lower alkanols, dioxane, formamide, dimethyl formamide, dimethyl sulfoxide, pyridine or N-methyl pyrrolidone.

The pyrazolone couplers useful for the purposes of this invention are represented by the formula:

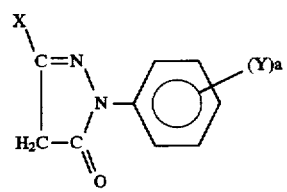

wherein X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; and a equals 1, 2 or 3. Alkoxy groups generally contain from 1 up to about 4 carbon atoms. Typically, X is a lower alkyl group containing one or two carbon atoms and is preferably a methyl group. A useful X group is also a carboxylic acid ester of an alcohol containing 1 or 2 carbon atoms and is preferably an ethyl ester group.

Typically, each Y is independently a lower alkyl or halogen group. The halogen group can be any of the halogens, although chlorine and bromine are generally used, with chlorine being the most preferred example of a halogen substituent. Usually, the lower alkyl groups contain one or two carbon atoms and a methyl group is a preferred substituent. Preferably, a is 1 or 2. A particularly useful embodiment is when a is 1 and Y is a methyl group in the 4 position.

Examples of the pyrazolone couplers useful for the purposes of this invention include 1-(4'-methylphenyl)-3-methyl-5-pyrazolone, 1-(4'-chlorophenyl)-3-methyl-5-pyrazolone, 1-(4'-methylphenyl)-3-carbethoxy-5-pyrazolone, etc.

Mixtures of two or more of any of the pyrazolone components are within the scope of this invention.

The coupling reaction useful for the purposes of the present invention may be effected preferably by adding the diazonium components to coupling components, but the coupling components can be added to the diazonium components. Coupling is generally effected at a temperature of from about −20° to about 80° C., preferably from about 20° to about 65° C. As in a diazotization reaction, coupling may be carried out in the presence of an appropriate surface active agent or organic solvent, such as all of those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component.

In another embodiment of the present invention, the dispersibility of the pigments of the present invention can be improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The composition prepared by the above-described coupling reaction can be metallized by a divalent metal salt which forms the sulfonate or carboxylate salt. This is also known as laking and forms the azo pigment. The metal salt may be a salt of alkaline earth metals, manganese, nickel or zinc or mixtures of two or more of these metals. Alkaline earth metal salts are preferred. Alkaline earth metal salts such as $SrCl_2$ and $CaCl_2$ are particularly useful for this purpose. Metallization may be accomplished preferably by adding the metal salt to the dye after coupling of all the diazonium component present is complete or, by including the metal salt in the diazonium component whereby metallization occurs as the dye is formed.

In most applications, it is desirable, in order to achieve the full brightness and tinctorial strength, to heat the azo pigment. For example, the product of the metallization may be heated to reflux temperature for about 1 to 3 hours or at temperatures above 100° C. under pressure in the presence of the above-described resin soaps or other soluble resins.

After completion of the metallization, the azo pigments are recovered from the water-based reaction slurry by filtering to form a presscake of pigment which is washed with hot (e.g., 40°–60° C.) water so as to remove the excess acids, bases and salts formed in the coupling reaction. The presscake is typically washed with from about 10 to 20 times its volume of hot water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

The pigment compositions of this invention provide improved color strength, resistance to polar solvent, light fastness and/or heat stability and are useful as coloring agents in plastics, paints and inks.

This invention, therefore, also relates to paint, ink and plastic compositions comprising major amounts of a paint vehicle, ink vehicle or plastic and minor amounts of the compositions of this invention.

The paint, ink and plastic compositions in which the compositions of this invention are useful are well known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

See, for example, with regard to ink: R. H. Leach, editor, *The Printing Ink Manual*, Fourth Edition, Van Nostrand Reinhold (International) Co. Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants.

The following examples illustrate the compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

A diazo slurry is prepared by dissolving 22.2 parts 2-amino-5-chloro-4-methylbenzene-1-sulfonic acid (C Amine) in 390 parts water containing 4.0 parts sodium hydroxide, reprecipitating the C Amine with 26.0 parts 20° Baume hydrochloric acid, adding ice to make a 0° slurry, adding 7.0 parts sodium nitrite dissolved in 14 parts water and stirring the slurry at 0°–5° for 60 minutes.

A coupler slurry is prepared by dissolving 20.7 parts 1-(4'-methylphenyl)-3-methyl-5-pyrazolone (PTMP) in 205 parts water containing 4.5 parts sodium hydroxide at about 40°, reprecipitating the PTMP with 67.5 parts 10% acetic acid, adjusting the pH to 6.5 and heating the slurry to 60°–65°.

The diazo slurry is coupled into the coupler slurry over a period of 20 minutes, while the pH is maintained at 6.0–6.5 by addition of 10% sodium hydroxide and the temperature is maintained at 60°–65°. The slurry is stirred and heated for one hour, then split to give four equal parts of slurry 1.

EXAMPLE 1-1

To one part of slurry 1 at 40°–45° are added 12.3 parts of 30% calcium chloride dihydrate solution. The slurry is then heated, boiled for 30 minutes, iced to lower than 50° and filtered; the filtercake is washed with hot water, dried overnight at 700° and pulverized in an Osterizer to give a fine powder pigment 1-1.

EXAMPLE 1-2

The procedure of Example 1-1 is repeated, except that 17.6 parts of 30% strontium nitrate solution are used in place of the calcium chloride solution, to give pigment 1-2.

EXAMPLE 1-3

The procedure of Example 1-1 is repeated, except that 42.5 parts of 10% manganous sulfate monohydrate solution are used in place of the calcium chloride solution, to give pigment 1-3.

EXAMPLE 1-4

The procedure of Example 1-1 is repeated, except that 24.0 parts of 30% zinc sulfate heptahydrate aqueous solution are used in place of the calcium chloride solution, to give pigment 1-4.

Comparative Example A

The procedure of Example 1 is repeated, except that 19.2 parts of 1-phenyl-3-methyl-5-pyrazolone (PMP) are used in place of the PTMP, to give slurry A.

Comparative Examples A-1 to A-4

The procedures of Examples 1-1 to 1-4 are repeated, except that slurry A is used in place of slurry 1, to give Comparative Examples A-1, A-2, A-3 and A-4.

EXAMPLE 2

The procedure of Example 1 is repeated, except that 22.2 parts of 2-amino-4-chloro-5-methylbenzene-1-sulfonic acid (2B Acid) are used in place of the C Amine, to give four equal parts of slurry 2.

EXAMPLE 2-1 to 2-4

The procedures of Examples 1-1 to 1-4 are repeated, except that slurry 2 is used in place of slurry 1, to give Examples 2-1, 2-2, 2-3 and 2-4.

EXAMPLE 3

The procedure of Example 1 is repeated, except that 23.7 parts of 2-amino-5-chloro-4-ethylbenzene-1-sulfonic acid (Ethyl C Amine) are used in place of the C Amine and 470 parts water are used in place of the 390 parts water, to give four equal parts of slurry 3.

EXAMPLE 3-1 to 3-4

The procedures of Examples 1-1 to 1-4 are repeated, except that slurry 3 is used in place of slurry 1, to give Examples 3-1, 3-2, 3-3 and 3-4.

EXAMPLE 4

The procedure of Example 1-1 is repeated, except that the coupling pH is controlled at 5.0–5.2 and the calcium chloride solution is added after the slurry is boiled at pH 10 for 30 minutes, to give Example 4.

EXAMPLE 5

The procedure of Example 3-1 is repeated, except that the coupling pH is controlled at 5.0–5.2, to give Example 5.

EXAMPLE 6

The procedure of Example 1-1 is repeated, except that 18.7 parts 2-amino-5-methylbenzene-1-sulfonic acid (4B Acid) are substituted for the C Amine in the diazo and the coupling pH is controlled at 5.0–5.2, to give Example 6.

EXAMPLE 7

The procedure of Example 1 is repeated, except that the coupler is added to a 5% acetic acid solution containing 2.2 parts of tallowalkyl propylenediamine (coupler is not reprecipitated) and the temperature during coupling is maintained at 20°–25° to give Example 7.

EXAMPLE 8

The procedure of Example 1-1 is repeated, except that the diazo is prepared by dissolving 13.7 parts 2-aminobenzoic acid in 100 parts 28° water containing 34 parts 20° Baume hydrochloric acid, then adding ice to make the 0° slurry, in place of the C Amine slurry; the pH during coupling is allowed to fall to 0.9, then raised to 4.0 with 65 parts sodium acetate trihydrate, to give Example 8.

EXAMPLE 9

The procedure of Example 1-1 is repeated, except that 22.3 parts 2-aminonaphthalene-1-sulfonic acid (Tobias Acid) are used in place of the C Amine, 25 parts sodium acetate trihydrate are added to the PTMP coupler slurry, the coupling temperature is 20°–25° and the pH is allowed to fall from 6.8 to 4.7, to give Example 9.

EXAMPLE 10

The procedure of Example 1-2 is repeated, except that 18.7 parts 2-amino-5-methylbenzene-1-sulfonic acid (4B Acid) are used in place of the C Amine, to give Example 10.

EXAMPLE 11

The procedure of Example 2-1 is repeated, except that 23.0 parts 1-(3'-chlorophenyl)-3-methyl-5-pyrazolone are used in place of the PTMP, to give Example 11.

Testing of Pigments

The standard pigment, to which the experimental pigments are compared, is Hoechst 11-3071 PV Fast Yellow HGR (P.Y. 191).

The pigments are tested as tints with titanium dioxide, either as 1:10 (pigment:titanium dioxide) or 1:1 tints in air-dry alkyd enamel drawdowns or as 1:19 tints in high density polyethylene injection molded chips, as follows:

Test Method I

A mixture of 0.60 part pigment, 6.0 parts titanium dioxide (DuPont Ti-Pure R-960), 23.2 parts air-dry alkyd enamel vehicle (containing 86% medium oil alkyd, 13% mineral spirits and 1% driers/antiskinning agent) and 75 parts media (Zirconia Zirbeads Y1304) is stirred with a spatula to a uniform mixture, sealed with a lid and shaken on a paint shaker for 30 minutes. The dispersion is separated from the media, drawn down with a 0.15 mm. gap coating bar on coated cardboard (Leneta Form 2-C) and allowed to dry for 1–2 days. Spectrophotometric values are measured with a Macbeth Color-Eye (specular component included, large area) to give the apparent strength and hue angle difference (DH) under Illuminant D, 10°, shown in the Tables. The drawdowns are exposed in a carbon arc or xenon arc Fade-O-Meter for 300 hours, then measured in the Color-Eye to give the Hunter Color-Difference (DE).

Test Method II

A mixture of 2.5 parts pigment, 2.5 parts titanium dioxide, 23.5 parts air-dry alkyd enamel vehicle described in Test Method I and 75 parts media (Zirconia Zirbeads 41304) is stirred with a spatula to a uniform mixture, sealed with a lid and shaken on a paint shaker for 30 minutes. The dispersion is separated from the media, drawn down with a 0.15 mm. gap coating bar on an aluminum panel and allowed to dry for 1–2 days. The panels are exposed in a Weatherometer, then measured after 200 hours, 500 hours and 800 hours in the Color-Eye to give the Hunter Color-Difference (DE).

Test Method III

A mixture of 0.125 part pigment, 2.375 part titanium dioxide (DuPont Ti-Pure R-960) and 500.0 parts high density polyethylene (Solvay T50-2000-G) is shaken on a paint shaker to uniformity, then injection molded at 232° in a 30 ton Battenfeld machine. As a measure of heat stability, the melt is held at 232° for an additional 15 minutes. Spectrophotometric values of the molded chips are measured as in Test Method I.

TABLE I

Results from Test Method I

| Pigment | Apparent Strength | DH | DE after 300 hrs. Exposure in Carbon Arc Fade-O-Meter |
|---|---|---|---|
| P.Y. 191 | Standard (K/S = 4.786) | Standard (h = 79.7°) | 2.09 |
| Ex. 1-1 | +54% | −4.4 | 2.54 |
| Ex. 1-2 | +36% | −3.1 | 3.97 |
| Ex. 1-3 | +62% | −4.9 | 3.50 |
| Ex. 1-4 | +55% | −5.0 | 2.64 |
| Comp. Ex. 1-1 | +35% | −3.3 | 10.34* |
| Comp. Ex. 1-2 | +78% | −0.9 | 6.90* |
| Comp. Ex. 1-3 | −10% | −3.3 | 5.69* |
| Comp. Ex. 1-4 | +23% | −2.9 | 12.77* |
| Ex. 8 | +7% | −3.6 | 3.84 |

*after 100 hrs.

TABLE II

Results from Test Method I

| Pigment | Apparent Strength | DH | DE after 300 hrs. Exposure in Xenon Arc Fade-O-Meter |
|---|---|---|---|
| P.Y. 191 | Standard (K/S = 4.786) | Standard (h = 79.7°) | 1.20 |
| Ex. 1-1 | +54 | −4.4 | 1.00 |
| Ex. 2-1 | +68 | −8.6 | 0.85 |
| Ex. 2-2 | +57 | −6.5 | 0.66 |
| Ex. 2-3 | +72 | −10.2 | 0.49 |
| Ex. 2-4 | +52 | −10.1 | 0.71 |
| Ex. 3-1 | +61 | −3.0 | 1.42 |
| Ex. 3-2 | +42 | −3.2 | 2.17 |
| Ex. 3-3 | +17 | −0.8 | 2.50 |
| Ex. 3-4 | +6 | −2.7 | 2.30 |
| Ex. 9 | +21 | +2.5 | 13.7 |
| Ex. 10 | +8 | −8.3 | 6.33 |
| Ex. 11 | +42 | +4.2 | 8.15 |

TABLE III

Results from Test Method II

| Pigment | Apparent Strength | DH | DE after Exposure in a Weatherometer for: | | |
|---|---|---|---|---|---|
| | | | 200 hrs. | 500 hrs. | 800 hrs. |
| P.Y. 191 | Standard (K/S = 20.334) | Standard (h = 74.8°) | 0.81 | 2.16 | 4.33 |
| Ex. 1-1 | +36% | −9.8 | 0.70 | 1.02 | 1.56 |
| Ex. 2-1 | +43% | −17.4 | 0.50 | 1.81 | 2.76 |
| Ex. 3-1 | +45% | −9.1 | 0.63 | 1.33 | 1.92 |

TABLE IV

Results from Test Method III

| Pigment | Apparent Strength | DH | Changes in Color Values After 15 minutes at 232° | |
|---|---|---|---|---|
| | | | DE | Strength |
| P.Y. 191 | Standard (K/S = 3.534) | Standard (h = 85.8°) | 0.28 | −4% |
| Ex. 2-1 | +22 | +0.9 | 1.65 | −4% |
| Ex. 4 | +42 | +1.7 | 0.32 | +1% |
| Ex. 5 | +25 | +2.7 | 0.95 | +3% |
| Ex. 6 | +40 | +1.9 | 0.37 | Equal |

As can be seen from the foregoing tables, the pigments of this invention generally show significant improvement in color strength, lightfastness and/or heat stability over Pigment Yellow 191 (Hoechst Yellow HGR).

What is claimed is:

1. An azo pigment composition comprising one or more compounds of the formula:

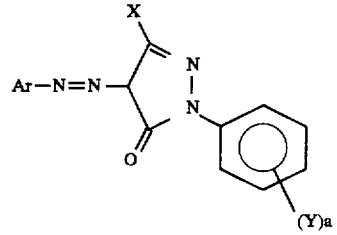

wherein X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; a equals 1, 2 or 3; and Ar is an aromatic moiety having as a substituent a divalent metal salt of a carboxylic acid or sulfonic acid group, provided that when Ar is monocyclic it is of the formula:

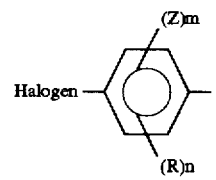

wherein each Z is independently a salt of a —COOH or —SO₃H group; m is 1 or 2; each R is independently a halogen, hydrocarbyl, hydrocarbyloxy, carboxylic acid ester, sulfonic acid ester, carboxylic acid amide, imidazolone, sulfonic acid amide or nitro group; and n is 0, 1 or 2.

2. A composition according to claim 1 wherein Z is a sulfonic acid salt of a divalent metal selected from the group consisting of alkaline earth metals, manganese, nickel and zinc.

3. A composition according to claim 1 wherein X and Y are each lower alkyl groups and a equals 1.

4. A composition according to claim 3 wherein X and Y are methyl groups.

5. A composition according to claim 1 wherein n equals 1; R is a methyl, or chloro group.

6. A process for preparing an azo pigment which comprises forming a dye by coupling (i) at least one diazonium component of one or more aromatic amines containing at least one sulfonic acid group or carboxylic acid group, or salts of such groups wherein the aromatic amines are selected from the group consisting of fused cyclic aromatic amines or aromatic amines of the formula:

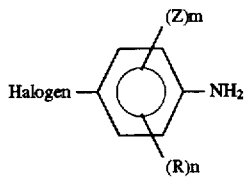

wherein each R is independently a halogen, hydrocarbyl, hydrocarbyloxy, carboxylic acid ester, sulfonic acid ester, carboxylic acid amide, imidazolone, sulfonic acid amide or nitro group; n is equal to 0, 1 or 2; each Z is independently a —COOH or —$SO_3H$ group, or salts of such groups; and m is equal to 1 or 2; with (ii) at least one coupling component of the formula:

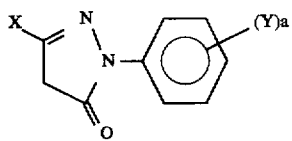

wherein X is a hydrocarbyl, carboxylic acid ester, sulfonic acid ester, carboxylic acid amide or sulfonic acid amide group; each Y is independently a hydrocarbyl, halogen, hydrocarbyloxy, carboxylic acid ester, sulfonic acid ester, carboxylic acid amide, imidazolone, sulfonic acid amide or nitro group; and a equals 1, 2 or 3; and metallizing said dye with at least one divalent metal.

7. A process according to claim 6 wherein X and Y are lower alkyl groups and a equals 1.

8. A process according to claim 6 wherein X and Y are methyl groups, a equals 1; R is a methyl or chloro group; n equals 1; Z is a —$SO_3H$ group or salt thereof and m equals 1.

9. A process wherein the azo dye prepared according to claim 6 is metallized with one or more of alkaline earth metals, manganese, nickel or zinc.

10. A composition prepared according to the process of claim 6.

11. A composition prepared according to the process of claim 9.

12. A paint composition comprising a paint vehicle and the composition of claim 1.

13. A paint composition comprising a paint vehicle and the composition of claim 10.

14. An ink composition comprising an ink vehicle and the composition of claim 1.

15. An ink composition comprising an ink vehicle and the composition of claim 10.

16. A plastic composition comprising a plastic material and the composition of claim 1.

17. A plastic composition comprising a plastic material and the composition of claim 10.

* * * * *